United States Patent
Toyoda et al.

(10) Patent No.: US 9,548,142 B2
(45) Date of Patent: Jan. 17, 2017

(54) HIGH-WITHSTANDING-VOLTAGE ALUMINA SINTERED COMPACT AND HIGH-WITHSTANDING-VOLTAGE MEMBER

(71) Applicant: KYOCERA Corporation, Kyoto-shi, Kyoto (JP)

(72) Inventors: Satoshi Toyoda, Kirishima (JP); Hidehiro Takenoshita, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 56 days.

(21) Appl. No.: 14/403,752

(22) PCT Filed: May 31, 2013

(86) PCT No.: PCT/JP2013/065247
§ 371 (c)(1),
(2) Date: Nov. 25, 2014

(87) PCT Pub. No.: WO2013/180289
PCT Pub. Date: Dec. 5, 2013

(65) Prior Publication Data
US 2015/0136452 A1 May 21, 2015

(30) Foreign Application Priority Data

May 31, 2012 (JP) .................... 2012-124474
Sep. 27, 2012 (JP) .................... 2012-214491

(51) Int. Cl.
| | | |
|---|---|---|
| *C04B 35/117* | (2006.01) | |
| *C04B 35/478* | (2006.01) | |
| *C04B 35/443* | (2006.01) | |
| *H01B 3/12* | (2006.01) | |
| *C04B 35/111* | (2006.01) | |
| *H01B 1/02* | (2006.01) | |
| *C01F 7/02* | (2006.01) | |
| *C04B 35/626* | (2006.01) | |
| *C04B 35/64* | (2006.01) | |

(52) U.S. Cl.
CPC . *H01B 3/12* (2013.01); *C01F 7/02* (2013.01); *C04B 35/111* (2013.01); *C04B 35/117* (2013.01); *C04B 35/62695* (2013.01); *C04B 35/64* (2013.01); *H01B 1/02* (2013.01); *C01P 2006/40* (2013.01); *C04B 2235/3205* (2013.01); *C04B 2235/3206* (2013.01); *C04B 2235/3208* (2013.01); *C04B 2235/3213* (2013.01); *C04B 2235/3215* (2013.01); *C04B 2235/3218* (2013.01); *C04B 2235/3222* (2013.01); *C04B 2235/3224* (2013.01); *C04B 2235/3225* (2013.01); *C04B 2235/3232* (2013.01); *C04B 2235/3239* (2013.01); *C04B 2235/3241* (2013.01); *C04B 2235/3262* (2013.01); *C04B 2235/3272* (2013.01); *C04B 2235/3275* (2013.01); *C04B 2235/3279* (2013.01); *C04B 2235/3281* (2013.01); *C04B 2235/3284* (2013.01); *C04B 2235/3418* (2013.01); *C04B 2235/5436* (2013.01); *C04B 2235/5445* (2013.01); *C04B 2235/5463* (2013.01); *C04B 2235/6562* (2013.01); *C04B 2235/6565* (2013.01); *C04B 2235/77* (2013.01); *C04B 2235/80* (2013.01); *C04B 2235/9646* (2013.01)

(58) Field of Classification Search
CPC ........................... C04B 35/111; C04B 35/117
See application file for complete search history.

(56) References Cited

U.S. PATENT DOCUMENTS

| | | | | |
|---|---|---|---|---|
| 4,595,665 A | * | 6/1986 | Takayama | ............ C04B 35/111 428/332 |
| 5,652,189 A | * | 7/1997 | Trabelsi | ................ F16K 25/005 501/127 |
| 5,658,838 A | * | 8/1997 | Trabelsi | ................ F16K 25/005 501/127 |
| 6,362,120 B1 | | 3/2002 | Fukushima | |
| 2011/0097582 A1 | * | 4/2011 | Tohma | .................. C04B 35/117 428/402 |

FOREIGN PATENT DOCUMENTS

| | | | |
|---|---|---|---|
| JP | 01212272 | * | 8/1989 |
| JP | 08-106828 A | | 4/1996 |
| JP | 2001002466 | * | 1/2001 |
| JP | 2001-072462 A | | 3/2001 |
| JP | 2011-072462 | | 4/2011 |

OTHER PUBLICATIONS

Office Action dated Oct. 20, 2015, issued in counterpart Japanese Application No. 2014-518764.
International Search Report (Form PCT/ISA/210) dated Sep. 3, 2013 issued for PCT/JP2013/065247.
Takayuki Sato et al., "Relation between Treatments for Alumi . . . "; The Institute of Electrical Engineers of Japan Hoden Kenkyukai Shiryo, Nov. 17, 1998, vol. ED-98,No. 199-208,pp. 19-24.
Hideharu Matsushima et al., "Cathodoluminescence and Surface . . . "; The Institute of Electrical Engineers of Japan Hoden Kenkyukai Shiryo, Nov. 18, 1999, vol.ED-99,No. 175-182,pp. 37-42.

* cited by examiner

*Primary Examiner* — Karl Group
(74) *Attorney, Agent, or Firm* — Procopio Cory Hargreaves and Savitch LLP

(57) ABSTRACT

The high-withstanding-voltage member includes an alumina sintered compact containing alumina as a main crystal. Furthermore, the alumina sintered compact exhibits a peak intensity of 5000 or less at a wavelength of about 330 nm when measured by a cathode luminescence method.

10 Claims, No Drawings

US 9,548,142 B2

HIGH-WITHSTANDING-VOLTAGE ALUMINA SINTERED COMPACT AND HIGH-WITHSTANDING-VOLTAGE MEMBER

TECHNICAL FIELD

The present invention relates to a high-withstanding-voltage alumina sintered compact used for portions required to maintain high electrical insulation even if voltage is applied, and to a high-withstanding-voltage member including the high-withstanding-voltage alumina sintered compact on which electrodes are provided.

BACKGROUND ART

The housings of X-ray tubes used in medical instruments, such as CT scanners, and other analyzers, such as transmission electron microscopes, to which high voltage is applied between the cathode and the anode, and the wall members and high-voltage introduction terminals of large-scale accelerators are required to have high insulation properties. These parts are made of various types of ceramics.

For example, PTL 1 suggests a use of alumina ceramics as the insulating member of a high-voltage bushing of an X-ray tube.

CITATION LIST

Patent Literature

PTL 1: Japanese Unexamined Patent Application

SUMMARY OF INVENTION

Technical Problem

If there are many oxygen vacancies at a surface of the ceramic of a portion required to have high insulation properties in a medical instrument such as a CT scanner or an analyzer such as a transmission electron microscope, electrons are released from the oxygen vacancies when a voltage is applied between the cathode and the anode. While these electrons are traveling from the cathode to the anode, electric discharge is repeated at the surface of the ceramic. This causes many electrons to flow and results in creepage breakdown.

Once such creepage breakdown occurs, the voltage applied between the cathode and anode of the medical instrument such as a CT scanner or the analyzer such as an electron transmission microscope drops instantaneously (this phenomenon hereinafter will be referred to as instantaneous voltage drop), and missing of important medical data or analytical data can occur undesirably.

From the viewpoint of accuracy improvement and weight saving, medical instruments and analyzers are desired to be downsized. In order to achieve such downsizing, the creepage distance that is the distance between the cathode and the anode must be reduced. Accordingly, oxygen vacancies at the surface of the ceramic are desired to be minimized to reduce the risk of creepage breakdown.

The present invention is made to satisfy the above-described demand, and an object of the present invention is to provide a high-withstanding-voltage alumina sintered compact in which creepage breakdown is unlikely to be caused by applied voltage, and a high-withstanding-voltage member including the high-withstanding-voltage alumina sintered compact on which electrodes are provided.

Solution to Problem

The high-withstanding-voltage alumina sintered compact of the present invention contains an alumina sintered compact containing alumina as a main crystal. The high-withstanding-voltage alumina sintered compact has a peak intensity of 5000 or less at a wavelength of about 330 nm when measured by a cathode luminescence method.

The high-withstanding-voltage member of the present invention includes the high-withstanding-voltage alumina sintered compact on which electrodes are provided.

Advantageous Effects of Invention

The high-withstanding-voltage alumina sintered compact of the present invention allows application of high voltage before reaching creepage breakdown and, accordingly, reduces the occurrence of instantaneous voltage drop. Consequently, data missing resulting from instantaneous voltage drop can be reduced.

In addition, since the high-withstanding-voltage member of the present invention, which includes the high-withstanding-voltage alumina sintered compact of the present invention on which electrodes are provided, also allows application of high voltage before reaching creepage breakdown, the creepage distance can be reduced. Accordingly, the use of the high-withstanding-voltage member leads to downsized instruments and apparatuses.

DESCRIPTION OF EMBODIMENTS

An embodiment of the high-withstanding-voltage alumina sintered compact and high-withstanding-voltage member of the present invention will now be described.

The high-withstanding-voltage alumina sintered compact of an embodiment of the present invention contains an alumina sintered compact containing alumina as a main crystal. The high-withstanding-voltage alumina sintered compact has a peak intensity of 5000 or less at a wavelength of about 330 nm when measured by a cathode luminescence method. The high-withstanding-voltage alumina sintered compact of the present embodiment is used in a portion within a medical instrument such as a CT scanner or any other analyzer such as a transmission electron microscope, required to have high insulation properties.

The alumina sintered compact mentioned herein refers to a sintered compact in which alumina accounts for 50% by mass or more of the total mass, or 100% by mass, of all the constituents. The main crystal mentioned herein refers to a crystal that is shown as the highest peak on a chart of X-ray diffraction analysis using Cu-Kα radiation. Peaks on the chart can be identified by being compared with JCPDS card data. From another point of view, the main crystal refers to a crystalline constituent that accounts for 50% or more of the area of a section of the sintered compact when observed through a scanning microscope (such as SEM).

Since the high-withstanding-voltage alumina sintered compact of the present embodiment exhibits a peak intensity of 5000 or more at a wavelength of about 330 nm when measured by a cathode luminescence method, the sintered compact allows application of high voltage before reaching creepage breakdown and, accordingly, reduces the occurrence of instantaneous voltage drop. Consequently, data missing resulting from instantaneous voltage drop can be reduced.

Since the high-withstanding-voltage alumina sintered compact of the present embodiment allows application of high voltage before reaching creepage breakdown, the use of a high-withstanding-voltage member including the high-withstanding-voltage alumina sintered on which electrodes (anode and cathode) are provided allows the creepage distance to be reduced in comparison with the case of using a sintered compact that allows only low voltage application and, accordingly, leads to downsized instruments and apparatuses.

The cathode luminescence method used herein refers to a method for detecting light emitted by irradiating the surface of a sample (ceramic in the present embodiment) with electron beam. The results of the measurement by this method can be checked on a chart with a horizontal axis representing the wavelength of light and a vertical axis representing light intensity.

For the high-withstanding-voltage alumina sintered compact of the present embodiment, the reason why the peak intensity at a wavelength of about 330 nm measured by a cathode luminescence method is selected is that this peak intensity represents the number of oxygen vacancies (F+ centers) capable of trapping one electron at the surface of the high-withstanding-voltage alumina sintered compact. Hence, a lower peak intensity at a wavelength of about 330 nm implies that the number of oxygen vacancies (F+ centers) is smaller. If the number of oxygen vacancies (F+ centers), which are a cause of repetitive electric discharge by electrons released when a voltage is applied, is small, the flow of electrons is hindered from growing, and accordingly, the occurrence of instantaneous voltage drop can be reduced.

Specifically, the measurement by a cathode luminescence method may be performed at room temperature (20° C.) and at an accelerating voltage of 10 kv, using, for example, a cathode luminescence spectroscopic system (SEM: S-4300SE manufactured by Hitatchi; spectroscope: HR-320 manufactured by Atago Bussan).

The magnitude of voltage allowed to be applied before reaching creepage breakdown can be checked as creepage breakdown voltage. The creepage breakdown voltage refers to the quotient of the voltage (kV) at the time instantaneous voltage drop caused by creepage breakdown divided by the creepage distance (mm). In the present embodiment, the creepage breakdown voltage of the high-withstanding-voltage alumina sintered compact is 5 kV/mm or more. It goes without saying that when the peak intensity at a wavelength of about 330 nm measured by a cathode luminescence method is less than 5000, the creepage breakdown voltage is less than 5 kV/mm. For measuring voltage, a voltmeter can be used.

A high creepage breakdown voltage means that the voltage allowed to be applied before reaching creepage breakdown is high. This implies that the creepage distance can be reduced and thus can achieve downsizing, accuracy improvement and weight saving of instruments and apparatuses including the high-withstanding-voltage member of the present embodiment.

Preferably, the high-withstanding-voltage alumina sintered compact of the present embodiment contains spinel that is an oxide crystal containing any one of magnesium, nickel, manganese, and zinc, and aluminum, and the alumina and spinel contain a transition metal. More specifically, a spinel is present with alumina that is the main crystal, and the alumina and spinel contain a transition metal.

The transition metal is selected from the group consisting of scandium (Sc), titanium (Ti), vanadium (V), chromium (Cr), manganese (Mn), iron (Fe), cobalt (Co), nickel (Ni), copper (Cu), and yttrium (Y).

The phrase "containing a transition metal" applies to the case where the presence of a transition metal, for example, titanium, is observed at the positions of Al and O in a mapping of alumina obtained using electron probe microanalyzer (EPMA), or the presence of titanium is observed in the position of Al, Mg and O in a mapping of a spinel, for example, $MgAl_2O_4$. Alternatively, the presence of a transition metal may be checked by irradiating the alumina or spinel with a spot (of 1 nm in diameter) using an energy dispersive X-ray spectrometer (EDS) supplied with a transmittance electron microscope (TEM) while the sample is observed through the TEM. The meaning of the phrase "containing a transition metal" includes containing a solid solution of a transition metal.

When the alumina and spinel of the high-withstanding-voltage alumina sintered compact of the present embodiment contain a transition metal, the transition metal probably fills the oxygen vacancies in the alumina and spine to reduce the oxygen vacancies, although the reason of this is not clear. Consequently, the voltage allowed to be applied before reaching creeping breakdown can be increased.

Preferably, the transition metal in the high-withstanding-voltage alumina sintered compact of the present embodiment is titanium and a constituent of the spinel thereof is magnesium.

When the transition metal is titanium and the constituent of the spinel is magnesium, the voltage allowed to be applied before reaching breakdown voltage can be increased. Although the reason of this is not clear as well, it has been confirmed that the highest creepage breakdown voltage can be obtained in this combination of the constituent of the spinel and the transition metal.

Preferably, the high-withstanding-voltage alumina sintered compact of the present embodiment is expressed by a composition formula $\alpha Al_2O_3 \cdot \beta TiO_2 \cdot \gamma MgO$ with mole percentages $\alpha$, $\beta$ and $\gamma$ satisfying the relationships: $80 \leq \alpha \leq 99.8$, $0.1 \leq \beta \leq 10$, $0.1 \leq \gamma \leq 10$, and $\alpha+\beta+\gamma=100$, and exhibits a peak intensity of 3000 or less at a wavelength of about 330 nm when measured by a cathode luminescence method.

In this composition, the voltage allowed to be applied before reaching creepage breakdown can be further increased, and accordingly, the occurrence of instantaneous voltage drop can be further reduced. Consequently, data missing resulting from instantaneous voltage drop can be further reduced. Also, since the creepage distance can be further reduced, instruments and apparatuses including the high-withstanding-voltage member can be further downsized.

The reason why a composition expressed by $\alpha Al_2O_3 \cdot \beta TiO_2 \cdot \gamma MgO$ satisfying the relationships $80 \leq \alpha \leq 99.8$, $0.1 \leq \beta \leq 10$, $0.1 \leq \gamma \leq 10$ and $\alpha+\beta+\gamma=100$ is used is that a high-withstanding-voltage alumina sintered compact having such a composition was able to reduce the oxygen vacancies (F+ centers) at the surface thereof. Although the reason why oxygen vacancies (F+ centers) are reduced is not clear, it is believed that titanium and magnesium in the above composition formula fill oxygen vacancies in the alumina crystal.

The high-withstanding-voltage alumina sintered compact having the above-described composition and exhibiting a peak intensity of 3000 or less at a wavelength of about 330 nm when measured by a cathode luminescence method has a creepage breakdown voltage of 10 kV/mm or more.

For determining the mole percentages of the constituents $Al_2O_2$, $TiO_2$, and MgO in the high-withstanding-voltage alumina sintered compact, the amount of metals Al, Ti and Mg in a sample solution, which is prepared by pulverizing part of the high-withstanding-voltage alumina sintered compact and dissolving the pulverized sample in a solution of hydrochloric acid or the like, is measured with an ICP (Inductively Coupled Plasma) emission spectrophotometer (ICPS-8100 manufactured by Shimadzu Corporation), and the resulting amounts of the metals are converted to the amounts of $Al_2O_2$, $TiO_2$ and MgO. The mole proportions of $Al_2O_2$, $TiO_2$ and MgO are calculated from the amounts of $Al_2O_2$, $TiO_2$ and MgO using their molecular weights. The mole percentages of the constituents are thus obtained by multiplying the mole ratio of each constituent to the total mole by 100.

Also, it is preferable that the high-withstanding-voltage alumina sintered compact of the present embodiment be expressed by a composition formula $\alpha Al_2O_2 \cdot \beta TiO_2 \cdot MgO$ with mole percentages $\alpha$, $\beta$ and $\gamma$ satisfying the relationships: $80 \leq \alpha \leq 99.8$, $0.1 \leq \beta \leq 10$, $0.1 \leq \gamma \leq 10$, and $\alpha + \beta + \gamma = 100$, and exhibit a peak intensity of 160 or less at a wavelength of about 420 nm when measured by a cathode luminescence method. In this composition, release of electrons likely to induce creepage breakdown when a voltage is applied is suppressed. Accordingly, creepage breakdown becomes unlikely to occur and the occurrence of instantaneous voltage drop is further reduced. Consequently, data missing resulting from instantaneous voltage drop can be reduced. In addition, since the creepage distance can be reduced, instruments and apparatuses including the high-withstanding-voltage member can be downsized.

The reason why the peak intensity at a wavelength of about 420 nm measured by a cathode luminescence method is selected is that this peak intensity represents the number of oxygen vacancies (F centers) capable of trapping two electrons at the surface of the high-withstanding-voltage alumina sintered compact. Hence, a lower peak intensity around this wavelength implies that the number of oxygen vacancies (F centers) is smaller. The measurement by a cathode luminescence method is performed under the same conditions using the same apparatus as described above.

The two electrons trapped in the oxygen vacancies (F centers) tend to be released when a voltage is applied and are therefore likely to induce creepage breakdown. When the peak intensity at a wavelength of about 420 nm is 160 or less in a measurement by a cathode luminescence method, the number of electrons that can induce creepage breakdown is small, and accordingly creepage breakdown is unlikely to occur.

How much unlikely creepage breakdown is can be estimated by measuring the initial creepage voltage. The initial creepage voltage refers to the quotient of the voltage at the time, for example, electrons released by applying a voltage between a cathode and an anode have first reached the anode along the surface of a compact, divided by the creepage distance, and it can be measured in the same manner as the above-described measurement for creepage breakdown voltage. The initial creepage voltage is lower than the voltage at which voltage drop caused by creepage breakdown occurs, and a high-withstanding-voltage alumina sintered compact having the above-described composition and exhibiting a peak intensity of 160 or less at a wavelength of about 420 nm when measured by a cathode luminescence method exhibits an initial creepage voltage of 4 kV/mm or more.

The high-withstanding-voltage alumina sintered compact of the present embodiment preferably has a peak intensity of 3000 or less at a wavelength of about 330 nm and a peak intensity of 160 or less at a wavelength of about 420 nm when measured by a cathode luminescence method. Such a high-withstanding-voltage alumina sintered compact has few oxygen vacancies (F+ centers) capable of trapping one electron and few oxygen vacancies (F centers) capable of trapping two electrons. Accordingly, the flow of electrons is hindered from growing, and also electron release that is likely to induce creepage breakdown is reduced. Consequently, creepage breakdown becomes more unlikely to occur.

More preferably, the peak intensity at a wavelength of about 330 nm is 850 or less, and the peak intensity at a wavelength of about 420 nm is 100 or less, when measured by a cathode luminescence method.

Preferably, the high-withstanding-voltage alumina sintered compact of the present embodiment is expressed by a composition formula $\alpha Al_2O_3 \cdot \beta TiO_2 \cdot \gamma MgO$, and the mole percentages $\alpha$, $\beta$ and $\gamma$ satisfy the relationships: $90 \leq \alpha \leq 98.5$, $0.5 \leq \beta \leq 5$, $0.5 \leq \gamma \leq 5$, and $\alpha + \beta + \gamma = 100$.

When the composition formula is expressed by $\alpha Al_2O_3 \cdot \beta TiO_2 \cdot \gamma MgO$ and the mole percentages $\alpha$, $\beta$ and $\gamma$ satisfy the relationships: $90 \leq \alpha \leq 98.5$, $0.5 \leq \beta \leq 5$, $0.5 \leq \gamma \leq 5$, and $\alpha + \beta + \gamma = 100$, the sintered compact exhibits a lower peak intensity at a wavelength of about 330 nm when measured by a cathode luminescence method and a higher creepage breakdown voltage. Also, such a sintered compact exhibits a lower peak intensity at a wavelength of about 420 nm when measured by a cathode luminescence method and a higher initial creepage voltage. Since this suggests that the sintered compact has few oxygen vacancies (F+ centers and F centers), the flow of electrons is hindered from growing, and also electron release that is likely to induce creepage breakdown is reduced. Consequently, creepage breakdown becomes more unlikely to occur.

In the high-withstanding-voltage alumina sintered compact of the present embodiment, the ratio of $\beta$ to $\gamma$ of the composition formula, that is, the $\beta/\gamma$ value, is preferably in the range of 0.5 to 2.0. When the ratio of $\beta$ to $\gamma$, that is, the $\beta/\gamma$ value, is in the range of 0.5 to 2.0, the creepage breakdown voltage is increased, so that titanium and magnesium can easily fill the oxygen vacancies in the alumina crystal. It is therefore believed that the number of oxygen vacancies (F+ centers and F centers) can be reduced to further increase the creepage breakdown voltage and the initial creepage voltage, and that thus the creepage breakdown becomes unlikely to occur.

Preferably, the high-withstanding-voltage alumina sintered compact of the present embodiment further contains an oxide of at least either Si or Ca, and the content of this oxide in terms of $SiO_2$ and CaO in total is 5% by mass or less (not 0% by mass) relative to the total mass, 100% by mass, of $Al_2O_2$, $TiO_2$ and MgO. In this instance, the oxide of at least either Si or Ca acts as a sintering agent to reduce firing temperature and increase density. The density can be measured in accordance with JIS R1634-1998.

Exemplary processes for manufacturing the high-withstanding-voltage alumina sintered compact of the present embodiment will now be described.

In a first exemplary process, an aluminum oxide powder having an average particle size of about 1 µm and a particle size distribution with a 80% cumulative particle size of 1.75 µm or less is prepared as a primary material. The 80% cumulative particle size in the particle size distribution of the aluminum oxide powder can be measured by laser diffraction scattering using, for example, a microtrac apparatus (MT 3300 EXII, manufactured by Nikkiso).

A predetermined amount of the aluminum oxide powder is weighed out. Then, relative to 100% by mass of the primary material or aluminum oxide powder, for example, 5% by mass or less of a sintering agent, 1% to 1.5% by mass of a binder such as PVA (polyvinyl alcohol), 100% by mass of a solvent, and 0.1% to 0.5% by mass of a dispersant are added into a stirring vessel, and the materials are mixed and stirred to yield a slurry. The slurry is granulated into granules in a spray granulator (spray dryer).

Subsequently, the resulting granules are formed into a predetermined shape by die pressing, isostatic pressing (rubber press) or any other forming technique, followed by optional cutting work. The formed material is then fired at a maximum temperature in the range of 1400° C. to 1700° C. in an air atmosphere. After being fired at a maximum temperature for a predetermined period of time, the material is exposed to a range of temperatures from a maximum temperature to 1000° C. for a long time. Using the primary material of alumina containing few coarse particles and exposing the formed material to a range of temperatures form the maximum temperature to 1000° C. allow oxygen to be sufficiently introduced into the $Al_2O_3$ crystal grains during firing, thereby reducing oxygen vacancies. After being fired, the material is subjected to cutting for finishing to yield a high-withstanding-voltage alumina sintered compact.

Next, a second exemplary process will be described which uses magnesium as the constituent of the spinel and titanium as the transition metal. First, predetermined amounts of aluminum oxide powder, magnesium hydroxide powder, and titanium oxide powder are weighed out as a primary material. At this time, the ratio of the particle size of the aluminum oxide powder to the particle size of the magnesium hydroxide powder is set to 0.6 or less (for example, the particle size of the alumina oxide powder is 0.6 µm or less, while the particle size of the magnesium hydroxide powder is 1 µm). The use of an aluminum oxide powder having a smaller particle size helps the activity of the alumina and facilitates the formation of spinel. Also, an aluminum oxide powder having a 80% cumulative particle size of 1.75 or less times of the average particle size is selected.

In addition, the ratio of the particle size of the titanium oxide powder to the particle size of the aluminum hydroxide powder is set to 0.6 or less (for example, the particle size of the titanium oxide powder is 0.6 µm or less, while the particle size of the aluminum hydroxide powder is 1 µm) to facilitate the presence of titanium in the alumina and spinel. The subsequent process may be performed in the same manner as in the foregoing first process.

In a third exemplary process, first, an aluminum oxide powder having an average particle size of about 1 µm, a magnesium hydroxide powder, and a titanium oxide powder are prepared as a primary material for preparing a composition $\alpha Al_2O_3 \cdot \beta TiO_2 \cdot \gamma MgO$ with mole percentages $\alpha$, $\beta$ and $\gamma$ satisfying $80 \leq \alpha \leq 99.8$, $0.1 \leq \beta \leq 10$, $0.1 \leq \gamma \leq 10$ and $\alpha+\beta+\gamma=100$. The above materials are weighed out such that the Al content is 80% to 99.8% by mass in terms of $Al_2O_3$; the Ti content, 0.1% to 10% by mass in terms of $TiO_2$; the Mg content, 0.1% to 10% by mass in terms of MgO; and the total content, 100% by mass.

In this instance, it is advantageous that is the ratio of the particle size of the magnesium hydroxide powder to the particle size of the aluminum oxide powder, and the ratio of the particle size of the titanium oxide powder to the particle size of the aluminum oxide powder are each in the range of 0.8 to 1.5 (for example, the particles sizes of the magnesium hydroxide powder and the titanium oxide powder are in the range of 0.8 µm to 1.5 µm, while the particle size of the aluminum oxide powder is 1 µm) in the primary material. By controlling the particle size ratio in this range, titanium oxide and magnesium hydroxide become easy to disperse uniformly. Consequently, titanium and magnesium are easily dissolved to form a solid solution in alumina, thus reducing oxygen vacancies.

The heating rate up to a maximum temperature for firing is preferably 200° C./h or less. This heating rate is based on the results of the studies of the present inventors. By setting the heating rate to this level, the peak intensity at a wavelength of about 330 nm, measured by a cathode luminescence method, can be reduced.

The cooling rate from a maximum temperature to 800° C. for firing is preferably 200° C./h or less. This cooling rate is based on the result of the studies of the present inventors. By setting the cooling rate to this level, the peak intensity at a wavelength of about 420 nm, measured by a cathode luminescence method, can be reduced.

In order to further increase the density of the high-withstanding-voltage alumina sintered compact of the present embodiment, at least either silicon oxide ($SiO_2$) or calcium carbonate ($CaCO_3$) is added when the slurry is prepared. The total content of silicon oxide and calcium carbonate is preferably 5% by mass or less relative to the total mass, 100% by mass, of aluminum oxide, titanium oxide and aluminum hydroxide.

Examples of the present invention will now be described in detail. However, the invention is not limited to the Examples.

Example 1

Aluminum oxide powders each having a particle size distribution with the 80% cumulative particle size shown in Table 1 were used as the primary materials, and samples were prepared under the condition where the cooling rate from a maximum temperature was set as shown in Table 1. Then, the peak intensity at a wavelength of about 330 nm measured by a cathode luminescence method and the creepage breakdown voltage were compared among the samples. The samples were prepared as below.

First, an aluminum oxide powder having an average particle size of about 1 µm and a particle size distribution with a 80% cumulative particle size shown in Table 1 was prepared as the primary material. Then, a predetermined amount of the aluminum oxide powder is weighed out. Relative to 100% by mass of the primary material or aluminum oxide powder, 3% by mass of a sintering agent, 1% by mass of a binder (PVA), 100% by mass of a solvent, and 0.2% by mass of a dispersant were added into a stirring vessel, and the materials were mixed and stirred to yield a slurry. The slurry was granulated into granules in a spray granulator (spray dryer).

Subsequently, a die was charged with the granules and pressed. Then, the sample was cut into a compact having a predetermined shape. The resulting compact was kept at the maximum temperature of 1600° C. in an air atmosphere in a firing furnace, and then cooled from the maximum temperature under the cooling condition shown in Table 1, thus yielding a sintered compact. The resulting sintered compact was cut into a plurality of samples, each in a circular plate having a diameter of 20 mm and a thickness of 5 mm.

The samples were measured by a cathode luminescence method. The measurement was performed at room temperature (20° C.) and at an acceleration voltage of 10 kV, using a cathode luminescence spectroscopic system (SEM: S-4300SE manufactured by Hitatchi; spectroscope: HR-320 manufactured by Atago Bussan), and charts (the horizontal axis represents the wavelength of light, and the vertical axis represents the light intensity) were obtained which show the results of light emitted when the surface of the sample was irradiated with an electron beam. The peak intensities at a wavelength of about 330 nm are shown in Table 1.

Next, each sample was provided with electrode at ends of the main surfaces thereof by metalization. Then, a high voltage was gradually applied from a large capacity power source (maximum voltage: 120 kV) to the samples through conducting wires connected to each of the metal electrodes from the power source terminal. Then, the creepage breakdown voltage was calculated by dividing the voltage at which voltage drop occurred by the creepage distance that is the distance between the electrodes, that is, by the thickness of the sample (5 mm). The results are shown in Table 1.

TABLE 1

| Sample No. | 80% cumulative particle size in particle size distribution | Cooling rate from the maximum temperature | Peak intensity at 330 nm | Creepage breakdown voltage kV/mm |
|---|---|---|---|---|
| 1 | 2.00 | None (Natural cooling) | 12000 | 2.8 |
| 2 | 2.00 | Cooling rate 50° C./h | 7600 | 3.6 |
| 3 | 2.00 | Kept at 1200° C. for 10 hours | 5700 | 4.0 |
| 4 | 1.75 | None (Natural cooling) | 10000 | 3.0 |
| 5 | 1.75 | Cooling rate 50° C./h | 4900 | 5.1 |
| 6 | 1.75 | Kept at 1200° C. for 10 hours | 4500 | 5.2 |
| 7 | 1.50 | None (Natural cooling) | 9200 | 3.2 |
| 8 | 1.50 | Cooling rate 50° C./h | 4500 | 5.4 |
| 9 | 1.50 | Kept at 1200° C. for 10 hours | 4300 | 5.5 |
| 10 | 1.00 | None (Natural cooling) | 8900 | 3.4 |
| 11 | 1.00 | Cooling rate 50° C./h | 4200 | 5.6 |
| 12 | 1.00 | Kept at 1200° C. for 10 hours | 4000 | 5.7 |
| 13 | 0.75 | None (Natural cooling) | 8800 | 3.3 |
| 14 | 0.75 | Cooling rate 50° C./h | 3900 | 5.8 |
| 15 | 0.75 | Kept at 1200° C. for 10 hours | 3600 | 5.9 |
| 16 | 0.50 | None (Natural cooling) | 8800 | 3.4 |
| 17 | 0.50 | Cooling rate 50° C./h | 3500 | 5.9 |
| 18 | 0.50 | Kept at 1200° C. for 10 hours | 3400 | 6.0 |

Table 1 shows that Sample Nos. 1 to 3 having particle size distributions with a 80% cumulative particle size of 2 μm, Sample Nos. 4, 7, 10, 13 and 16 that had been naturally cooled without setting cooling condition from the maximum temperature exhibited peak intensities of more than 5000 at a wavelength of about 330 nm when measured by a cathode luminescence method, and low creepage breakdown voltages of less than 5 kV/mm.

On the other hand, Sample Nos. 5, 6, 8, 9, 11, 12, 14, 15, 17 and 18 exhibited peak intensities of 5000 or less at a wavelength of about 330 nm on the chart obtained by a cathode luminescence method, and creepage breakdown voltages of 5 kV/mm or more. These results show that when the peak intensity at a wavelength of about 330 nm is 5000 or less on a chart obtained by a cathode luminescence method, creepage breakdown is unlikely to occur. In addition, it was found that the peak intensity at a wavelength of about 330 nm measured by a cathode luminescence method can be controlled to 5000 or less by setting the particle size distribution to a 80% cumulative particle size of 1.75 μm or less, and by exposing the sample to a temperature range from a maximum temperature to 1000° C. for a long time.

Example 2

First, an magnesium hydroxide powder having an average particle size of 1 μm, and aluminum oxide powders and titanium oxide powders each having a particle size of which the ratio to the particle size of the aluminum magnesium hydroxide powder is shown in Table 2 were prepared as primary materials. The aluminum oxide powder had a 80% cumulative particle size of 1.75 times of the average particle size. The aluminum oxide powder, the titanium oxide powder, and the magnesium hydroxide powder were weighed out as the primary materials so as to have an $Al_2O_3$ content of 80% by mole, a $TiO_2$ content of 10% by mole and a MgO content of 10% by mole.

Then, relative to the total mass, 100% by mass, of the primary material, 1% by mass of PVA (polyvinyl alcohol), 100% by mass of a solvent, and 0.2% by mass of a dispersant were added into a stirring vessel, and the materials were mixed and stirred to yield a slurry. The slurry was granulated into granules in a spray granulator (spray dryer).

Subsequently, a die was charged with the granules and pressed. Then, the sample was cut into a compact having a predetermined shape. The resulting compact was placed in a firing furnace and fired in an air atmosphere. The firing was performed under the same condition as Sample No. 6 in Example 1. After the firing, the compact was cut into a plurality of samples, each in a circular plate having a diameter of 20 mm and a thickness of 5 mm.

Then, metal electrodes were bonded to the main surfaces of each sample by metalization for measuring creepage breakdown voltage. The results of the measurements are shown in Table 2.

Also, each sample was partially pulverized into powder, and the powder was dissolved in a solution of hydrochloric acid or the like. The solution of the sample was measured with an ICP (Inductively Coupled Plasma) emission spectrophotometer (ICPS-8100 manufactured by Shimadzu Corporation). The measured amounts of metals Al, Ti and Mg were converted to the amounts of $Al_2O_3$, $TiO_2$ and MgO. Then the mole proportions of $Al_2O_3$, $TiO_2$ and MgO were calculated from the amounts of $Al_2O_3$, $TiO_2$ and MgO using their molecular weights. The mole percentages of the constituents were determined by multiplying the mole ratio of each constituent to the total mole by 100. It was thus confirmed that the mole percentages were the same as those when the materials had been weighed out.

TABLE 2

| Sample No. | $Al_2O_3/Mg(OH)_2$ particle size ratio | $TiO_2/Mg(OH)_2$ particle size ratio | Presence of spinel | Presence of titanium in alumina | Presence of titanium in spinel | Creepage breakdown voltage (kV/mm) |
|---|---|---|---|---|---|---|
| 19 | 1.00 | 1.00 | No | No | — | 10.0 |
| 20 | 1.00 | 0.50 | No | Yes | — | 10.5 |
| 21 | 0.70 | 0.50 | No | Yes | — | 10.9 |
| 22 | 0.60 | 0.50 | Yes | Yes | Yes | 12.5 |
| 23 | 0.50 | 0.50 | Yes | Yes | Yes | 13.2 |
| 24 | 0.50 | 1.00 | Yes | No | No | 10.1 |
| 25 | 0.50 | 0.70 | Yes | No | No | 10.4 |
| 26 | 0.50 | 0.60 | Yes | Yes | Yes | 12.2 |

Table 2 shows that Sample Nos. 22, 23 and 26 exhibited high creepage breakdown voltages. It was thus found that a composition containing alumina and spinel each of which contains titanium increases the voltage allowed to be applied before reaching creepage breakdown.

Example 3

Next, Sample Nos. 27 to 34 in which the transition metal and constituent of the spinel were changed as shown in Table 3 were prepared and subjected to measurements for creepage breakdown voltage. The obtained values were ranked. This Example was performed in the same manner as in Example 2 except that the powders of the transition metal source and constituent of the spinel source were changed. The results are shown in Table 3.

TABLE 3

| Sample No. | Transition metal | Constituent of the spinel | Ordinal rank of creepage breakdown voltage |
|---|---|---|---|
| 27 | Ti | Mg | 1 |
| 28 | Ti | Ni | 2 |
| 29 | Ti | Mn | 3 |
| 30 | Ti | Zn | 4 |
| 31 | Fe | Mg | 5 |
| 32 | Fe | Mn | 6 |
| 33 | Fe | Zn | 7 |
| 34 | Fe | Ni | 8 |

Table 3 shows that when Ti (titanium) and Mg (magnesium) were used as the combination of a transition metal and the constituent of the spinel, the highest creepage breakdown voltage was exhibited.

Example 4

For preparing samples, materials were weighed out so that the composition $\alpha Al_2O_3 \cdot \beta TiO_2 \cdot MgO$ would had the mole percentages $\alpha$, $\beta$ and $\gamma$ shown in Table 4, and fired under the condition at a heating rate shown in Table 4. The samples were measured for peak intensity at a wavelength of about 330 nm by a cathode luminescence method and for creepage breakdown voltage, and the results were compared. The samples were prepared as below.

First, an aluminum oxide powder having an average particle size of 1 μm, a titanium oxide powder having an average particle size of 1 μm, and a magnesium hydroxide powder having a particle size of which the ratio to the particle size of the aluminum oxide powder is shown in Table 4 were prepared for a primary material. Then, the aluminum oxide, titanium oxide and magnesium hydroxide were weighed out so that their mole percentages would be as shown in Table 4. Then, compacts were formed in the same manner as in Example 2.

Each compact was placed in a firing furnace, and was then heated at a heating rate shown in Table 4 and fired at the maximum temperature of 1600° C. in an air atmosphere. After the firing, the compact was cut into a plurality of samples, each in a circular plate having a diameter of 20 mm and a thickness of 5 mm.

The samples were measured by a cathode luminescence method under the same condition using the same apparatus as in Example 1. Also, metal electrodes were bonded to the main surfaces of each sample by metalization for measuring creepage breakdown voltage. The results of the measurements are shown in Table 4.

Also, the mole percentages were obtained in the manner described in Example 2. The results are shown in Table 4.

TABLE 4

| | Mole percentage | | | | | $Al_2O_3/Mg(OH)_2$ | Heating | Peak | Creepage breakdown |
| | | | | | | | | | |
| Sample No. | $Al_2O_3$ $\alpha$ | $TiO_2$ $\beta$ | MgO $\gamma$ | $\alpha + \beta + \gamma$ | $\beta/\gamma$ | particle size ratio | rate ° C./h | intensity at 330 nm | voltage kV/mm |
|---|---|---|---|---|---|---|---|---|---|
| 35 | 98.95 | 1.00 | 0.05 | 100 | 20.00 | 1.05 | 100 | 3300 | 9.1 |
| 36 | 98.90 | 1.00 | 0.10 | 100 | 10.00 | 1.05 | 100 | 2600 | 11.0 |
| 37 | 98.50 | 1.00 | 0.50 | 100 | 2.00 | 1.05 | 100 | 95 | 17.7 |
| 38 | 98.00 | 1.00 | 1.00 | 100 | 1.00 | 1.05 | 100 | 80 | 17.8 |
| 39 | 97.00 | 1.00 | 2.00 | 100 | 0.50 | 1.05 | 100 | 95 | 17.7 |
| 40 | 94.00 | 1.00 | 5.00 | 100 | 0.20 | 1.05 | 100 | 800 | 15.8 |
| 41 | 89.00 | 1.00 | 10.00 | 100 | 0.10 | 1.05 | 100 | 2700 | 10.7 |
| 42 | 88.00 | 1.00 | 11.00 | 100 | 0.09 | 1.05 | 100 | 3200 | 9.4 |

TABLE 4-continued

| Sample No. | Mole percentage Al₂O₃ α | TiO₂ β | MgO γ | α + β + γ | β/γ | Al₂O₃/Mg(OH)₂ particle size ratio | Heating rate °C./h | Peak intensity at 330 nm | Creepage breakdown voltage kV/mm |
|---|---|---|---|---|---|---|---|---|---|
| 43 | 98.95 | 0.05 | 1.00 | 100 | 0.05 | 1.05 | 100 | 3250 | 9.2 |
| 44 | 98.90 | 0.10 | 1.00 | 100 | 0.10 | 1.05 | 100 | 2700 | 10.7 |
| 45 | 98.50 | 0.50 | 1.00 | 100 | 0.50 | 1.05 | 100 | 95 | 17.7 |
| 46 | 97.00 | 2.00 | 1.00 | 100 | 2.00 | 1.05 | 100 | 90 | 17.8 |
| 47 | 94.00 | 5.00 | 1.00 | 100 | 5.00 | 1.05 | 100 | 750 | 16.0 |
| 48 | 89.00 | 10.00 | 1.00 | 100 | 10.00 | 1.05 | 100 | 2850 | 10.3 |
| 49 | 88.00 | 11.00 | 1.00 | 100 | 11.00 | 1.05 | 100 | 3150 | 9.5 |
| 50 | 99.85 | 0.05 | 0.10 | 100 | 0.50 | 1.05 | 100 | 3850 | 8.1 |
| 51 | 99.85 | 0.10 | 0.05 | 100 | 2.00 | 1.05 | 100 | 3700 | 8.3 |
| 52 | 99.80 | 0.10 | 0.10 | 100 | 1.00 | 1.05 | 100 | 2900 | 10.2 |
| 53 | 99.00 | 0.50 | 0.50 | 100 | 1.00 | 1.05 | 100 | 250 | 17.3 |
| 54 | 97.50 | 0.50 | 2.00 | 100 | 0.25 | 1.05 | 100 | 670 | 16.2 |
| 55 | 94.50 | 0.50 | 5.00 | 100 | 0.10 | 1.05 | 100 | 800 | 15.8 |
| 56 | 97.50 | 2.00 | 0.50 | 100 | 4.00 | 1.05 | 100 | 680 | 16.2 |
| 57 | 94.50 | 5.00 | 0.50 | 100 | 10.00 | 1.05 | 100 | 850 | 15.7 |
| 58 | 96.00 | 2.00 | 2.00 | 100 | 1.00 | 1.05 | 100 | 100 | 17.7 |
| 59 | 93.00 | 2.00 | 5.00 | 100 | 0.40 | 1.05 | 100 | 750 | 16.0 |
| 60 | 93.00 | 5.00 | 2.00 | 100 | 2.50 | 1.05 | 100 | 800 | 15.8 |
| 61 | 90.00 | 5.00 | 5.00 | 100 | 1.00 | 1.05 | 100 | 150 | 17.6 |
| 62 | 80.00 | 10.00 | 10.00 | 100 | 1.00 | 1.05 | 100 | 2650 | 10.6 |
| 63 | 79.00 | 10.00 | 11.00 | 100 | 0.91 | 1.05 | 100 | 3400 | 8.9 |
| 64 | 79.00 | 11.00 | 10.00 | 100 | 1.10 | 1.05 | 100 | 3450 | 8.8 |
| 65 | 98.00 | 1.00 | 1.00 | 100 | 1.00 | 0.75 | 100 | 3150 | 9.5 |
| 66 | 98.00 | 1.00 | 1.00 | 100 | 1.00 | 0.80 | 100 | 2850 | 10.2 |
| 67 | 98.00 | 1.00 | 1.00 | 100 | 1.00 | 1.00 | 100 | 680 | 16.3 |
| 68 | 98.00 | 1.00 | 1.00 | 100 | 1.00 | 1.25 | 100 | 570 | 16.5 |
| 69 | 98.00 | 1.00 | 1.00 | 100 | 1.00 | 1.50 | 100 | 2350 | 11.8 |
| 70 | 98.00 | 1.00 | 1.00 | 100 | 1.00 | 1.60 | 100 | 3150 | 9.3 |
| 71 | 98.00 | 1.00 | 1.00 | 100 | 1.00 | 1.05 | 300 | 4600 | 8.5 |
| 72 | 98.00 | 1.00 | 1.00 | 100 | 1.00 | 1.05 | 220 | 3250 | 9.4 |
| 73 | 98.00 | 1.00 | 1.00 | 100 | 1.00 | 1.05 | 200 | 2550 | 11.1 |
| 74 | 98.00 | 1.00 | 1.00 | 100 | 1.00 | 1.05 | 180 | 2150 | 12.5 |
| 75 | 98.00 | 1.00 | 1.00 | 100 | 1.00 | 1.05 | 50 | 80 | 17.8 |
| 76 | 98.00 | 1.00 | 1.00 | 100 | 1.00 | 1.05 | 10 | 80 | 17.8 |

Table 4 shows that Sample Nos. 36 to 41, 44 to 48, 52 to 62, 66 to 69 and 73 to 76, which had compositions $\alpha Al_2O_3 \cdot \beta TiO_2 \cdot \gamma MgO$ with mole percentages α, β and γ satisfying the relationships: $80 \le \alpha \le 99.8$, $0.1 \le \beta \le 10$, $0.1 \le \gamma \le 10$, and $\alpha+\beta+\gamma=100$, exhibited peak intensities of 3000 or less at a wavelength of 330 nm when measured by a cathode luminescence method and creepage breakdown voltages of 10 kV/mm or more, and allowed high voltage application before reaching creepage breakdown. It was thus found that such a composition is unlikely to cause instantaneous voltage drop and accordingly reduces data missing resulting from instantaneous voltage drop. In addition, since the creepage distance can be reduced accordingly, medical instruments, such as CT scanners, and other analyzers, such as transmission electron microscopes, can be downsized.

Also, the results of Sample Nos. 65 to 70 suggest that an advantageous ratio of $Al_2O_3/Mg(OH)_2$ particle sizes is in the range of 0.8 to 1.5. Furthermore, the results of Sample Nos. 38 and 71 to 76 suggest that an advantageous heating rate is 200° C./h or less. In the results of Sample Nos. 38, 75 and 76, the values of peak intensity at a wavelength of about 330 nm and creepage breakdown voltage were not varied under the condition of 100° C./h or less. This suggests that the advantageous heating rate, from the viewpoint of manufacturing cost and manufacturing time, is in the range of 100° C./h to 200° C./h.

Example 5

Next, for preparing samples, materials were weighed out so that the composition $\alpha Al_2O_3 \cdot \beta TiO_2 \cdot \gamma MgO$ had the mole percentages α, β and γ shown in Table 5, and fired under the condition at a cooling rate shown in Table 5. The samples were measured for peak intensity at a wavelength of about 420 nm by a cathode luminescence method and for initial creepage voltage, and the results were compared. The samples were prepared as below.

The preparation of the samples was performed in the same manner as in Example 4 except that the ratio of the average particle size of the titanium oxide to the average particle size of the aluminum oxide (particle size ratio) was set as shown in Table 5; the average particle size of the magnesium hydroxide was 1 μm; and the cooling rate from the maximum temperature to 800° C. was as shown in Table 5.

The samples were measured for peak intensity at about 420 nm by a cathode luminescence method under the same condition using the same apparatus as in Example 1. The results are shown in Table 5. In addition, each sample was provided with electrodes at ends of the main surfaces thereof by metalization in the same manner as in Example 1. Then, the voltage at the time electron released by gradually applying a high voltage in the same manner as in the measurement for creepage breakdown voltage had first reached the end of the creepage distance along the surface of the sample was divided by the creepage distance (thickness of the sample, 5 mm) that is the distance between the metal electrodes. Thus, the initial creepage voltage of each sample was calculated, and the results are shown in Table 5. Also, the mole percentages of $Al_2O_3$, $TiO_2$ and MgO were calculated in the same manner as in Example 2, and the results are shown in Table 5.

TABLE 5

| Sample No. | Mole percentage Al₂O₃ α | TiO₂ β | MgO γ | α + β + γ | β/γ | Al₂O₃/TiO₂ particle size ratio | Cooling rate °C./h | Peak intensity at 420 nm | Initial creepage voltage kV/mm |
|---|---|---|---|---|---|---|---|---|---|
| 77 | 98.95 | 1.00 | 0.05 | 100 | 20.00 | 1.05 | 100 | 170 | 3.5 |
| 78 | 98.90 | 1.00 | 0.10 | 100 | 10.00 | 1.05 | 100 | 155 | 4.4 |
| 79 | 98.50 | 1.00 | 0.50 | 100 | 2.00 | 1.05 | 100 | 65 | 9.4 |
| 80 | 98.00 | 1.00 | 1.00 | 100 | 1.00 | 1.05 | 100 | 45 | 10.5 |
| 81 | 97.00 | 1.00 | 2.00 | 100 | 0.50 | 1.05 | 100 | 60 | 9.7 |
| 82 | 94.00 | 1.00 | 5.00 | 100 | 0.20 | 1.05 | 100 | 105 | 7.2 |
| 83 | 89.00 | 1.00 | 10.00 | 100 | 0.10 | 1.05 | 100 | 155 | 4.4 |
| 84 | 88.00 | 1.00 | 11.00 | 100 | 0.09 | 1.05 | 100 | 165 | 3.8 |
| 85 | 98.95 | 0.05 | 1.00 | 100 | 0.05 | 1.05 | 100 | 163 | 3.9 |
| 86 | 98.90 | 0.10 | 1.00 | 100 | 0.10 | 1.05 | 100 | 154 | 4.4 |
| 87 | 98.50 | 0.50 | 1.00 | 100 | 0.50 | 1.05 | 100 | 70 | 9.1 |
| 88 | 97.00 | 2.00 | 1.00 | 100 | 2.00 | 1.05 | 100 | 65 | 9.4 |
| 89 | 94.00 | 5.00 | 1.00 | 100 | 5.00 | 1.05 | 100 | 105 | 7.0 |
| 90 | 89.00 | 10.00 | 1.00 | 100 | 10.00 | 1.05 | 100 | 156 | 4.2 |
| 91 | 88.00 | 11.00 | 1.00 | 100 | 11.00 | 1.05 | 100 | 164 | 3.8 |
| 92 | 99.85 | 0.05 | 0.10 | 100 | 0.50 | 1.05 | 100 | 182 | 3.0 |
| 93 | 99.85 | 0.10 | 0.05 | 100 | 2.00 | 1.05 | 100 | 180 | 3.1 |
| 94 | 99.80 | 0.10 | 0.10 | 100 | 1.00 | 1.05 | 100 | 158 | 4.3 |
| 95 | 99.00 | 0.50 | 0.50 | 100 | 1.00 | 1.05 | 100 | 72 | 9.2 |
| 96 | 97.50 | 0.50 | 2.00 | 100 | 0.25 | 1.05 | 100 | 86 | 8.2 |
| 97 | 94.50 | 0.50 | 5.00 | 100 | 0.10 | 1.05 | 100 | 93 | 7.9 |
| 98 | 97.50 | 2.00 | 0.50 | 100 | 4.00 | 1.05 | 100 | 85 | 8.3 |
| 99 | 94.50 | 5.00 | 0.50 | 100 | 10.00 | 1.05 | 100 | 94 | 7.8 |
| 100 | 96.00 | 2.00 | 2.00 | 100 | 1.00 | 1.05 | 100 | 55 | 10.0 |
| 101 | 93.00 | 2.00 | 5.00 | 100 | 0.40 | 1.05 | 100 | 87 | 8.2 |
| 102 | 93.00 | 5.00 | 2.00 | 100 | 2.50 | 1.05 | 100 | 88 | 8.1 |
| 103 | 90.00 | 5.00 | 5.00 | 100 | 1.00 | 1.05 | 100 | 75 | 8.9 |
| 104 | 80.00 | 10.00 | 10.00 | 100 | 1.00 | 1.05 | 100 | 153 | 4.6 |
| 105 | 79.00 | 10.00 | 11.00 | 100 | 0.91 | 1.05 | 100 | 168 | 3.7 |
| 106 | 79.00 | 11.00 | 10.00 | 100 | 1.10 | 1.05 | 100 | 170 | 3.6 |
| 107 | 98.00 | 1.00 | 1.00 | 100 | 1.00 | 0.75 | 100 | 162 | 3.8 |
| 108 | 98.00 | 1.00 | 1.00 | 100 | 1.00 | 0.80 | 100 | 143 | 5.0 |
| 109 | 98.00 | 1.00 | 1.00 | 100 | 1.00 | 1.00 | 100 | 88 | 8.2 |
| 110 | 98.00 | 1.00 | 1.00 | 100 | 1.00 | 1.25 | 100 | 79 | 8.8 |
| 111 | 98.00 | 1.00 | 1.00 | 100 | 1.00 | 1.50 | 100 | 144 | 5.1 |
| 112 | 98.00 | 1.00 | 1.00 | 100 | 1.00 | 1.60 | 100 | 167 | 3.8 |
| 113 | 98.00 | 1.00 | 1.00 | 100 | 1.00 | 1.05 | 300 | 189 | 2.6 |
| 114 | 98.00 | 1.00 | 1.00 | 100 | 1.00 | 1.05 | 220 | 163 | 3.8 |
| 115 | 98.00 | 1.00 | 1.00 | 100 | 1.00 | 1.05 | 200 | 152 | 4.5 |
| 116 | 98.00 | 1.00 | 1.00 | 100 | 1.00 | 1.05 | 180 | 135 | 5.6 |
| 117 | 28.00 | 1.00 | 1.00 | 100 | 1.00 | 1.05 | 50 | 45 | 10.5 |
| 118 | 98.00 | 1.00 | 1.00 | 100 | 1.00 | 1.05 | 10 | 45 | 10.5 |

Table 5 shows that Sample Nos. 78 to 83, 86 to 90, 94 to 104, 108 to 111, and 115 to 118, which had compositions $\alpha Al_2O_3 \cdot \beta TiO_2 \cdot \gamma MgO$ with mole percentages $\alpha$, $\beta$ and $\gamma$ satisfying the relationships: $80 \leq \alpha \leq 99.8$, $0.1 \leq \beta \leq 10$, $0.1 \leq \gamma \leq 10$, and $\alpha+\beta+\gamma=100$ and had peak intensities of 160 or less at a wavelength of 420 nm when measured by a cathode luminescence method, exhibited initial creepage voltages of 4 kV/mm or more. This suggests that these samples can reduce electron release that is likely to induce creepage breakdown when a voltage is applied. Thus, it was found that such a composition is unlikely to cause instantaneous voltage drop and accordingly reduce data missing resulting from instantaneous voltage drop. In addition, since the creepage distance can be reduced accordingly, medical instruments, such as CT scanners, and other analyzers, such as transmission electron microscopes, can be downsized.

Also, the results of Sample Nos. 107 to 112 suggest that an advantageous ratio of Al₂O₃/TiO₂ particle sizes is in the range of 0.8 to 1.5. Furthermore, the results of Sample Nos. 80 and 113 to 118 suggest that an advantageous cooling rate is 200° C./h or less. In the results of Sample Nos. 80, 117, 118, the values of peak intensity at a wavelength of about 420 nm and initial creepage voltage were not varied under the condition of 100° C./h or less. This suggests that the advantageous cooling rate, from the viewpoint of manufacturing cost and manufacturing time, is in the range of 100° C./h to 200° C./h.

Example 6

Next, Sample A (corresponding to Sample No. 38), Sample B (corresponding to Sample No. 53) and Sample C (corresponding to Sample No. 62) were prepared in the same manner as in Example 4, except that their proportions of Al₂O₃, TiO₂ and MgO were the same as those of Sample Nos. 38, 53, and 62 in Example 4; the particle size ratios of Al₂O₃/MgO and Al₂O₃/TiO₂ were each 1.05; the heating rate up to the maximum temperature was 100° C./h; and the cooling rate from the maximum temperature to 800° C. was 100° C./h.

Then, Samples A, B and C were measured by a cathode luminescence method in the same manner as the foregoing Examples. Also, creepage breakdown voltage and initial creepage voltage were measured.

Sample A exhibited a peak intensity of 80 at a wavelength of about 330 nm, a peak intensity of 45 at a wavelength of about 420 nm, a creepage breakdown voltage of 17.8 kV/mm, and an initial creepage voltage of 10.5 kV/mm. Sample B exhibited a peak intensity of 250 at a wavelength of about 330 nm, a peak intensity of 72 at a wavelength of about 420 nm, a creepage breakdown voltage of 17.3 kV/mm, and an initial creepage voltage of 9.2 kV/mm. Sample C exhibited a peak intensity of 2650 at a wavelength of about 330 nm, a peak intensity of 153 at a wavelength of about 420 nm, a creepage breakdown voltage of 10.6 kV/mm, and an initial creepage voltage of 4.6 kV/mm.

These results suggest that the peak intensities at wavelengths of about 330 nm and about 420 nm when measured by a cathode luminescence method can be reduced by controlling particle size ratios and firing conditions. This suggests that the flow of electrons can be hindered from growing, and also that electron release likely to induce creepage breakdown can be reduced. Hence, creepage breakdown becomes more unlikely to occur.

Example 7

Next, samples having $\beta/\gamma$ values shown in Table 6 were prepared, and the peak intensity at a wavelength of about 330 nm when measured by a cathode luminescence method and the creepage breakdown voltages were measured for comparison. The Samples were prepared in the same manner as in Example 1 except that the $Al_2O_3/MgO$ particle size ratio was set at 1.05; the heating rate was set at 100° C./h; and the $\beta/\gamma$ value was varied.

Then, measurements were performed in the same manner as in Example 1. Thus obtained peak intensities at a wavelength of about 330 nm and creepage breakdown voltages are shown in Table 6. Also, mole percentages were calculated in the same manner as in Example 2. The results are shown in Table 6. Sample No. 120 was the same as Sample No. 39; Sample No. 122 was the same as Sample No. 38; and Sample No. 124 was the same as Sample No. 37.

TABLE 6

| Sample No. | Mole percentage | | | $Al_2O_3/MgO$ particle size ratio | Heating rate ° C./h | $\beta/\gamma$ | Peak intensity at 330 nm | Creepage breakdown voltage kV/mm |
|---|---|---|---|---|---|---|---|---|
| | $Al_2O_3$ $\alpha$ | $TiO_2$ $\beta$ | MgO $\gamma$ | | | | | |
| 119 | 96.50 | 1.00 | 2.50 | 1.05 | 100 | 0.4 | 250 | 17.3 |
| 120 | 97.00 | 1.00 | 2.00 | 1.05 | 100 | 0.5 | 95 | 17.7 |
| 121 | 97.50 | 1.00 | 1.25 | 1.05 | 100 | 0.8 | 85 | 17.8 |
| 122 | 98.00 | 1.00 | 1.00 | 1.05 | 100 | 1.0 | 80 | 17.8 |
| 123 | 98.34 | 1.00 | 0.66 | 1.05 | 100 | 1.5 | 85 | 17.8 |
| 124 | 98.50 | 1.00 | 0.50 | 1.05 | 100 | 2.0 | 95 | 17.7 |
| 125 | 98.52 | 1.00 | 0.48 | 1.05 | 100 | 2.1 | 260 | 17.3 |

Table 6 shows that Sample Nos. 120 to 124 exhibited low peak intensities at a wavelength of about 330 nm when measured by a cathode luminescence method, and high creepage breakdown voltages, and thus suggests that an advantageous composition has a $\beta/\gamma$ value in the range of 0.5 to 2.0.

Example 8

Next, samples having $\beta/\gamma$ values as shown in Table 7 were prepared, and the peak intensity at a wavelength of about 420 nm when measured by a cathode luminescence method and the creepage breakdown voltages were measured for comparison. The Samples were prepared in the same manner as in Example 5 except that the $Al_2O_3/TiO_2$ particle size ratio was set at 1.05; the cooling rate was set at 100° C./h; and the $\beta/\gamma$ value was varied.

Then, measurements were performed in the same manner as in Example 5. Thus obtained peak intensities at a wavelength of about 420 nm and initial creepage voltages are shown in Table 7. Also, mole percentages were calculated in the same manner as in Example 2. The results are shown in Table 7. Sample No. 127 was the same as Sample No. 81; Sample No. 129 was the same as Sample No. 80; and Sample No. 131 was the same as Sample No. 79.

TABLE 7

| Sample No. | Mole percentage | | | $Al_2O_3/TiO_2$ particle size ratio | Heating rate ° C./h | $\beta/\gamma$ | Peak intensity at 420 nm | Initial creepage voltage kV/mm |
|---|---|---|---|---|---|---|---|---|
| | $Al_2O_3$ $\alpha$ | $TiO_2$ $\beta$ | MgO $\gamma$ | | | | | |
| 126 | 96.50 | 1.00 | 2.50 | 1.05 | 100 | 0.4 | 85 | 8.3 |
| 127 | 97.00 | 1.00 | 2.00 | 1.05 | 100 | 0.5 | 60 | 9.7 |
| 128 | 97.50 | 1.00 | 1.25 | 1.05 | 100 | 0.8 | 50 | 10.3 |
| 129 | 98.00 | 1.00 | 1.00 | 1.05 | 100 | 1.0 | 45 | 10.5 |
| 130 | 98.34 | 1.00 | 0.66 | 1.05 | 100 | 1.5 | 55 | 10.0 |
| 131 | 98.50 | 1.00 | 0.50 | 1.05 | 100 | 2.0 | 65 | 9.4 |
| 132 | 98.52 | 1.00 | 0.48 | 1.05 | 100 | 2.1 | 87 | 8.2 |

Table 7 shows that Sample Nos. 127 to 131 exhibited low peak intensities at a wavelength of about 420 nm when measured by a cathode luminescence method, and high initial creepage voltages, and thus suggests that an advantageous composition has a β/γ value in the range of 0.5 to 2.0.

Example 9

Next, materials were weighed out so that the proportions of $Al_2O_3$, $TiO_2$ and MgO were the same as Sample No. 38 in Example 4. Then, silicon oxide powder and calcium carbonate powder were weighed out so that the contents of $SiO_2$ and CaO relative to the total mass, 100% by mass, of the weighed aluminum oxide, titanium oxide and magnesium hydroxide would come to those shown in Table 8, and were placed into a stirring vessel together with the primary materials for preparing a slurry. Then, samples were formed in the same manner as in Example 4 and fired at temperatures up to the maximum temperature shown in Table 8, thus yielding Samples Nos. 133 to 145. The densities of the resulting samples were measured in accordance with JIS R1634-1998. The results are shown in Table 8. The density of Sample No. 133 at 1600° C. was the result of the measurement on Sample No. 38 in Example 4.

For measuring the contents of silicon oxide and calcium carbonate in the samples, the samples were each partially pulverized into powder, and the powder was dissolved in a solution of hydrochloric acid or the like. The solutions of the samples were measured with an ICP emission spectrophotometer. Thus measured amounts of metals Al, Ti, Mg, Si and Ca were converted to the amounts of $Al_2O_3$, $TiO_2$, MgO, $SiO_2$ and CaO, respectively. Then, the $SiO_2$ and CaO contents were calculated relative to the total mass, 100% by mass, of $Al_2O_3$, $TiO_2$ and MgO, and are shown in Table 6. The proportions of $Al_2O_3$, $TiO_2$ and MgO were the same as those of Sample No. 38 in Example 4.

TABLE 8

| Sample No. | Content mass % | | | Maximum firing temperature ° C. | Ceramic density g/cm³ |
|---|---|---|---|---|---|
| | $SiO_2$ | CaO | Total | | |
| 133 | 0 | 0 | 0 | 1400 | 3.60 |
| | | | | 1500 | 3.85 |
| | | | | 1600 | 3.90 |
| 134 | 0.001 | 0 | 0.001 | 1400 | 3.75 |
| | | | | 1500 | 3.90 |
| | | | | 1600 | 3.93 |
| 135 | 1 | 0 | 1 | 1400 | 3.84 |
| | | | | 1500 | 3.92 |
| | | | | 1600 | 3.94 |
| 136 | 5 | 0 | 5 | 1400 | 3.94 |
| | | | | 1500 | 3.94 |
| | | | | 1600 | 3.90 |
| 137 | 6 | 0 | 6 | 1400 | 3.86 |
| | | | | 1500 | 3.82 |
| | | | | 1600 | 3.80 |
| 138 | 0 | 0.001 | 0.001 | 1400 | 3.72 |
| | | | | 1500 | 3.89 |
| | | | | 1600 | 3.92 |
| 139 | 0 | 1 | 1 | 1400 | 3.83 |
| | | | | 1500 | 3.93 |
| | | | | 1600 | 3.94 |
| 140 | 0 | 5 | 5 | 1400 | 3.94 |
| | | | | 1500 | 3.92 |
| | | | | 1600 | 3.88 |
| 141 | 0 | 6 | 6 | 1400 | 3.85 |
| | | | | 1500 | 3.80 |
| | | | | 1600 | 3.74 |
| 142 | 0.0005 | 0.0005 | 0.001 | 1400 | 3.80 |
| | | | | 1500 | 3.93 |
| | | | | 1600 | 3.94 |
| 143 | 1 | 1 | 1 | 1400 | 3.92 |
| | | | | 1500 | 3.95 |
| | | | | 1600 | 3.95 |
| 144 | 2.5 | 2.5 | 5 | 1400 | 3.95 |
| | | | | 1500 | 3.95 |
| | | | | 1600 | 3.92 |
| 145 | 3 | 3 | 6 | 1400 | 3.87 |
| | | | | 1500 | 3.85 |
| | | | | 1600 | 3.82 |

Table 8 suggests that when an oxide of at least either Si or Ca is contained with a content of 5% by mass in terms of $SiO_2$ and CaO in total relative to the total mass, 100% by mass, of the constituents of the composition formula, these oxides acts as a sintering agent, thereby reducing the maximum temperature and increasing density.

The invention claimed is:

1. A high-withstanding-voltage alumina sintered compact comprising an alumina sintered compact containing alumina as a main crystal and a spinel that is oxide crystal containing magnesium and aluminum, wherein the alumina and the spinel contain a transition metal, and wherein the high-withstanding-voltage alumina sintered compact has a peak intensity of 5000 or less at a wavelength of about 330 nm when measured by a cathode luminescence method, and the transition metal is titanium.

2. The high-withstanding-voltage alumina sintered compact according to claim 1, wherein the sintered compact has a composition expressed by a composition formula $\alpha Al_2O_3 \cdot \beta TiO_2 \cdot \gamma MgO$ with mole percentages α, β and γ satisfying the following relationships and exhibits a peak intensity of 3000 or less at a wavelength of about 330 nm when measured by a cathode luminescence method, the relationships being:

$80 \leq \alpha \leq 99.8$;

$0.1 \leq \beta \leq 10$;

$0.1 \leq \gamma \leq 10$; and $\alpha + \beta + \gamma = 100$.

3. The high-withstanding-voltage alumina sintered compact according to claim 1, wherein the alumina sintered compact has a composition expressed by a composition formula $\alpha Al_2O_4 \cdot \beta TiO_2 \cdot \gamma MgO$ with mole percentages α, β and γ satisfying the following relationships and exhibits a peak intensity of 160 or less at a wavelength of about 420 nm when measured by a cathode luminescence method:

$80 \leq \alpha \leq 99.8$;

$0.1 \leq \beta \leq 10$;

$0.1 \leq \gamma \leq 10$; and $\alpha + \beta + \gamma = 100$.

4. The high-withstanding-voltage alumina sintered compact according to claim 2, wherein the mole percentages α, β and γ of the composition formula satisfy the following relationships:

$80 \leq \alpha \leq 98.5$;

$0.5 \leq \beta \leq 5$;

$0.5 \leq \gamma \leq 5$; and $\alpha + \beta + \gamma = 100$.

5. The high-withstanding-voltage alumina sintered compact according to claim 2, wherein the ratio $\beta/\gamma$ of the $\beta$ to the $\gamma$ of the composition formula is in the range of 0.5 to 2.0.

6. The high-withstanding-voltage alumina sintered compact according to claim 2, wherein the alumina sintered compact further contains an oxide of at least one of Si and Ca with a total content, in terms of $SiO_2$ and CaO, of 5% by mass or less (not 0% by mass) relative to 100% by mass of the constituents of the composition formula.

7. A high-withstanding-voltage member comprising the high-withstanding-voltage alumina sintered compact as set forth in claim 1 on which electrodes are provided.

8. The high-withstanding-voltage alumina sintered compact according to claim 3, wherein the mole percentages $\alpha$, $\beta$ and $\gamma$ of the composition formula satisfy the following relationships:

$90 \leq \alpha \leq 98.5$;

$0.5 \leq \beta \leq 5$;

$0.5 \leq \gamma \leq 5$; and $\alpha + \beta + \gamma = 100$.

9. The high-withstanding-voltage alumina sintered compact according to claim 3, wherein the ratio $\beta/\gamma$ of the $\beta$ to the $\gamma$ of the composition formula is in the range of 0.5 to 2.0.

10. The high-withstanding-voltage alumina sintered compact according to claim 3, wherein the alumina sintered compact further contains an oxide of at least one of Si and Ca with a total content, in terms of $SiO_2$ and CaO, of 5% by mass or less (not 0% by mass) relative to 100% by mass of the constituents of the composition formula.

* * * * *